(12) United States Patent
De Jong

(10) Patent No.: US 7,020,740 B2
(45) Date of Patent: Mar. 28, 2006

(54) COMPUTER ARRANGEMENT USING NON-REFRESHED DRAM

(75) Inventor: Eduard Karel De Jong, Amsterdam (NL)

(73) Assignee: Sun Microsystems, Inc., Santa Clara, CA (US)

( * ) Notice: Subject to any disclaimer, the term of this patent is extended or adjusted under 35 U.S.C. 154(b) by 303 days.

(21) Appl. No.: 10/148,927

(22) PCT Filed: Dec. 6, 2000

(86) PCT No.: PCT/NL00/00901

§ 371 (c)(1),
(2), (4) Date: Oct. 9, 2002

(87) PCT Pub. No.: WO01/40911

PCT Pub. Date: Jun. 7, 2001

(65) Prior Publication Data

US 2003/0093615 A1    May 15, 2003

(30) Foreign Application Priority Data

Dec. 6, 1999 (WO) .................... PCT/NL99/00746

(51) Int. Cl.
*G06F 12/02* (2006.01)
(52) U.S. Cl. ..................................... 711/106
(58) Field of Classification Search ................ 711/105, 711/106; 365/222
See application file for complete search history.

(56) References Cited

U.S. PATENT DOCUMENTS

| | | | |
|---|---|---|---|
| 4,425,642 A | 1/1984 | Moses et al. | |
| 4,582,985 A | 4/1986 | Lofberg | |
| 4,853,522 A | 8/1989 | Ogasawara | |
| 4,874,935 A | 10/1989 | Younger | |
| 4,921,278 A | 5/1990 | Shiang et al. | |
| 4,930,129 A | 5/1990 | Takahira | |
| 4,953,160 A | 8/1990 | Gupta | |
| 5,057,997 A | 10/1991 | Chang et al. | |
| 5,148,546 A | 9/1992 | Blodgett | |
| 5,204,663 A | 4/1993 | Lee | |
| 5,204,897 A | 4/1993 | Wyman | |
| 5,283,885 A | 2/1994 | Hollerbauer | |
| 5,404,377 A | 4/1995 | Moses | |
| 5,446,901 A | 8/1995 | Owicki et al. | |
| 5,452,431 A | 9/1995 | Bournas | |
| 5,453,602 A | 9/1995 | Hanada | |

(Continued)

FOREIGN PATENT DOCUMENTS

DE         4126213         2/1993

(Continued)

OTHER PUBLICATIONS

K. Matsui, et al., "Video-Steganography: How to Secretly Embed a Signature in a Picture," IMA Intellectual Property Project Proceedings, vol. 1, Issue 1, pp. 187-206 (Jan. 1994).

(Continued)

*Primary Examiner*—Hiep T. Nguyen
(74) *Attorney, Agent, or Firm*—Finnegan, Henderson, Farabow, Garrett & Dunner

(57) ABSTRACT

A computer arrangement with a processor (5) and at least one memory unit (7, 9, 11, 13) connected to the processor (5) and including dynamic random access memory (13), wherein the computer arrangment is arranged to use but not to refresh at least part of the dynamic random access memory (13) while running a program.

25 Claims, 4 Drawing Sheets

U.S. PATENT DOCUMENTS

| | | | |
|---|---|---|---|
| 5,469,559 | A | 11/1995 | Parks et al. |
| 5,479,509 | A | 12/1995 | Ugon |
| 5,481,715 | A | 1/1996 | Hamilton et al. |
| 5,511,176 | A * | 4/1996 | Tsuha .................. 711/106 |
| 5,534,372 | A | 7/1996 | Koshizuka et al. |
| 5,544,246 | A | 8/1996 | Mandelbaum et al. |
| 5,594,227 | A | 1/1997 | Deo |
| 5,649,118 | A | 7/1997 | Carlisle et al. |
| 5,649,188 | A | 7/1997 | Nomura et al. |
| 5,657,379 | A | 8/1997 | Honda et al. |
| 5,721,781 | A | 2/1998 | Deo et al. |
| 5,742,756 | A | 4/1998 | Dillaway et al. |
| 5,754,649 | A | 5/1998 | Ryan et al. |
| 5,768,385 | A | 6/1998 | Simon |
| 5,781,723 | A | 7/1998 | Yee et al. |
| 5,790,489 | A | 8/1998 | O'Connor |
| 5,802,519 | A | 9/1998 | De Jong |
| 5,832,119 | A | 11/1998 | Rhoads |
| 5,862,117 | A | 1/1999 | Fuentes et al. |
| 5,869,823 | A | 2/1999 | Bublitz et al. |
| 5,881,152 | A | 3/1999 | Moos |
| 5,884,316 | A | 3/1999 | Bernstein et al. |
| 5,889,868 | A | 3/1999 | Moskowitz et al. |
| 5,894,550 | A | 4/1999 | Thiriet |
| 5,896,393 | A | 4/1999 | Yard et al. |
| 5,905,798 | A | 5/1999 | Nerlikar et al. |
| 5,912,453 | A | 6/1999 | Gungl et al. |
| 5,915,027 | A | 6/1999 | Cox et al. |
| 5,930,363 | A | 7/1999 | Stanford et al. |
| 5,940,363 | A | 8/1999 | Ro et al. |
| 6,005,940 | A | 12/1999 | Kulinets |
| 6,052,690 | A | 4/2000 | De Jong |
| 6,055,615 | A * | 4/2000 | Okajima .................. 711/169 |
| 6,058,483 | A | 5/2000 | Vannel |
| 6,094,656 | A | 7/2000 | De Jong |
| 6,094,705 | A * | 7/2000 | Song .................. 711/106 |
| 6,168,207 | B1 | 1/2001 | Nishizawa |
| 6,173,391 | B1 | 1/2001 | Tabuchi et al. |
| 6,182,158 | B1 | 1/2001 | Kougiouris et al. |
| 6,212,633 | B1 | 4/2001 | Levy et al. |
| 6,220,510 | B1 | 4/2001 | Everett et al. |
| 6,241,153 | B1 | 6/2001 | Tiffany, III |
| 6,250,555 | B1 | 6/2001 | Inamoto |
| 6,257,486 | B1 | 7/2001 | Teicher et al. |
| 6,257,490 | B1 * | 7/2001 | Tafoya .................. 235/462.24 |
| 6,292,874 | B1 | 9/2001 | Barnett |
| 6,310,956 | B1 | 10/2001 | Morito et al. |
| 6,311,186 | B1 | 10/2001 | MeLampy et al. |
| 6,311,280 | B1 * | 10/2001 | Vishin .................. 713/320 |
| 6,325,285 | B1 | 12/2001 | Baratelli |
| 6,349,336 | B1 | 2/2002 | Sit et al. |
| 6,374,355 | B1 | 4/2002 | Patel |
| 6,385,645 | B1 | 5/2002 | De Jong |
| 6,480,831 | B1 | 11/2002 | Cordery et al. |
| 6,480,935 | B1 | 11/2002 | Carper et al. |
| 6,484,946 | B1 | 11/2002 | Matsumoto et al. |
| 6,535,997 | B1 | 3/2003 | Janson et al. |
| 6,546,112 | B1 | 4/2003 | Rhoads |
| 6,572,025 | B1 | 6/2003 | Nishikado et al. |
| 6,608,911 | B1 | 8/2003 | Lofgren et al. |
| 6,742,712 | B1 | 6/2004 | Kawaguchi et al. |

FOREIGN PATENT DOCUMENTS

| | | |
|---|---|---|
| DE | 4242247 A1 | 6/1994 |
| DE | 19600081 | 7/1997 |
| EP | 0190733 | 8/1986 |
| EP | 0251861 A1 | 1/1988 |
| EP | 0466969 | 1/1992 |
| EP | 0581317 A2 | 2/1994 |
| EP | 0666550 | 8/1995 |
| EP | 0674295 A1 | 9/1995 |
| EP | 0723226 | 7/1996 |
| EP | 0849734 A2 | 6/1998 |
| EP | 0864996 A2 | 9/1998 |
| EP | 0 893 752 A1 | 1/1999 |
| EP | 0 917 152 A1 | 5/1999 |
| FR | 2776153 | 9/1999 |
| JP | 01277993 A | 11/1989 |
| JP | 02156357 A | 6/1990 |
| JP | 05089303 A | 4/1993 |
| JP | 09326046 A | 6/1999 |
| JP | 200015886 | 1/2000 |
| JP | 2001126046 | 5/2001 |
| WO | WO 87/07062 | 11/1987 |
| WO | WO 89/02140 | 3/1989 |
| WO | WO 94/10657 | 5/1994 |
| WO | WO 97/41562 | 11/1997 |
| WO | WO 98/19237 | 5/1998 |
| WO | WO 98/37526 | 9/1998 |
| WO | WO 99/16030 | 9/1998 |
| WO | WO 99/35791 | 7/1999 |
| WO | WO 99/38162 | 7/1999 |

OTHER PUBLICATIONS

Sun Microsystems, Inc., "Java Card Runtime Environment (JCRE) 2.1 Specification," Final Revision 1.0, Feb. 24, 1999 60 pages.

Tetsushi, Hikawa and Yukihiro, Ukai, "Storage Medium and Storage Medium Driving Device," Patent Abstracts of Japan, JP 11161551 (Jun. 18, 1999).

Chan, "Infrastructure of Multi-Application Smart Card," http://home/hkstar.com/~alanchan/papers/multiApplicationSmartCard/, Jul. 25, 2002. 12 pages.

Cordonnier, et al., "The Concept of Suspicion: A New Security Model for Identification, Management in Smart Cards," http://inforge.unil.ch/isdss97/papers/48.htm, (1997). 15 pages.

Daniels, John et al., "Strategies for Sharing Objects in Distributed Systems," JOOP, Object Designers Ltd., Uk., pp. 27-36.

Gong, L. et al., "Going Beyond the Sandbox: An Overview of the New Security Architecture in the JavaDevelopment Kit 1.2" Proc. Usenix Sym. Internet Technologies and Systems, Dec. 8, 1997. 14 pages.

Islam, et al., "A Flexible Security Model for Using Internet Content," IBM Thomas J. Watson Research Center Papers, 'Online!', Jun. 28, 1997, from http://www.ibm.com/java/education/flexsecurity. 14 pages.

Lee, Chan Y., "Detecting Out-Of-Range References," http://127.0.0.1:8080/vtopic/isapi?action+View&VdkVgwKev=%2E@2E%2Fdata%F1 993%2F, Jul. 24, 2002.

Philips Semiconductor, "Designers Offered First 16-Bit Smart Card IC Architecture with Development Tools," Press Release, Jul. 25, 2002. 2 pages.

Ritchey, Tim, "Advanced Topics: The Java Virtual Machine," Java!, Chapter 14, pp. ii-x and 325-346, Sep. 22, 1995. 28 pages.

Sun Microsystems, Inc., "Java Card™ 2.0 Language Subset and Virtual Machine Specification," Oct. 13, 1997, Revision 1.0 Final. 15 pages.

Sun Microsystems, Inc., "Java Card™ 2.0 Programming Concepts," Oct. 15, 1997, Revision 1.0 Final. 33 pages.

"Sun Microsystems Announces JAVACARD API," Business Wire, Oct. 1996. 3 pages.

Sun Microsystems, Inc., "Java Card Runtime Environment (JCRE) 2.1 Specification—Draft 2," Dec. 14, 1998. 31 pages.

"Java Card Applet Developer's Guide," Revision 1.12, Aug. 19, 1998, Sun Microsystems, Inc. 58 pages.

Sun Microsystems, Inc., "Java Card™ 2.0 Application Programming Interfaces," Oct. 13, 1997, Revision 1.0 Final. 76 pages.

* cited by examiner

COMPUTER ARRANGEMENT USING NON-REFRESHED DRAM

FIELD OF THE INVENTION

The present invention relates to a computer arrangement comprising a processor and at least one memory unit connected to the processor and comprising dynamic random access memory having a predetermined retention time, the computer arrangement being arranged for running a predetermined program on the processor while temporarily storing data during a storage time in at least part of the dynamic random access memory.

PRIOR ART

EP-A-0 917 152 discloses a semiconductor circuit and a method of controlling such a circuit. The circuit comprises dynamic random access memory (DRAM). The object is to decrease the frequency of times of refreshing operations of such DRAM in order to achieve power consumption. This object is obtained refreshing only those rows in the DRAM that contain valid data used by the logic portion of the circuit. DRAM portions that do not contain valid data are not refreshed thus saving time and power.

Similar techniques of refreshing only those portions of DRAM that contain valid data are disclosed by U.S. Pat. Nos. 5,1148,546, 5,283,885, and 5,469,559.

OBJECTIVES

The general objective of the present invention is to provide a method and arrangement that provide an even more effective use of DRAM and, ultimately, avoid any refreshment of DRAM.

Traditionally, all smart cards have chips which are implemented with static random access memory (RAM) cells. By using memory array imaging techniques it may be possible to maliciously extract data from such RAM. Therefore, in an embodiment, it is an objective of the invention to apply such DRAM in smart cards to reduce the risk of maliciously break-in into RAM cells by scanning data retained therein.

DESCRIPTION OF THE INVENTION

Therefore, in accordance with the invention the storage time is shorter than the retention time and the computer arrangement is arranged to use but not to refresh the at least part of the dynamic random access memory comprising the data during the running of the program.

The invention is based on the observation that in specific fields of use, notably (contactless) smart cards, the inherent time requirements are such that limited retention without refresh of data by DRAM cells is no longer an obstacle to effective use thereof.

A DRAM cell typically utilizes a single (MOS) transistor whereas a traditional RAM cell of the static type requires four or more (MOS) transistors. In accordance with the invention, part of the DRAM is not refreshed while running a program. Since no refresh operation is used the time that data is retained in the DRAM cells depends on the electrical capacity of the DRAM cell. The retention time depends on the design parameters of the cell. In many smart card applications, processing of data must be completed in less than 150 ms. DRAM cells having a retention time of for instance a few hundreds of ms can easily be designed.

Thus, data necessary for carrying out some computations can be retained long enough in DRAM cells properly designed. Since after the retention time, all data will be lost, the invention provided improves security by increasing the difficulty of maliciously extracting data from the memory.

One way in which the invention may be implemented is by not connecting the at least part of the dynamic random access memory to refresh circuitry. An alternative is to disable a refresh function of existing refresh circuitry for the at least part of the dynamic random access memory.

Since a single DRAM cell requires less space on a silicon chip than does one static RAM cell, using the same size of chip area results in having a larger memory capacity. Alternatively, the same number of necessary memory cells results in a smaller silicon area required. This is especially important for smart cards where RAM is typically the relatively largest area component. Therefore, the present invention also results in the possibility of reducing costs of smart card chips.

Therefore, the present invention also relates to a smart card provided with a computer arrangement as defined above.

However, the invention does not only relate to smart cards or the like but also to further computers like terminals arranged to communicate with such cards.

To that end the present invention relates to a terminal provided with a terminal processor and a terminal communication interface connected to said terminal processor and arranged for communicating with a computer arrangement comprising a processor, a communication interface and at least one memory unit, said communication interface and said at least one memory unit being connected to said processor, said at least one memory unit comprising memory for storing a computer program with a predetermined sequence of instructions and dynamic random access memory, said computer arrangement being arranged to use but not to refresh at least part of said dynamic random access memory while running said program, wherein said terminal processor is arranged to carry out the following steps:
(a) emulating the computer program;
(b) analyzing time period necessary for the processor of the computer arrangement to carry out each instruction of the sequence of instructions and determining all retention times necessary for the processor to temporarily store data in the at least part of the dynamic random access memory during carrying out the sequence of instructions;
(c) establishing sets of consecutive instructions for which the retention times are longer than a predetermined refresh time;
(d) adding additional instructions to the sets of consecutive instructions in order to obtain modified retention times for those sets of consecutive instructions which modified retention times are shorter than the predetermined refresh time.

It is observed that in this definition the term "terminal" is to be interpreted broadly, as including any type of computer arrangement arranged to communicate with the computer arrangement comprising the DRAM memory as defined above. Moreover, the term "terminal processor" is not intended to limit this processor to one single processor. It may include several parallel processing and communicating sub-processors, some of which are even allowed to be physically located outside the terminal.

By using such a further computer arrangement, it is certain that data to be stored by the program to be carried out by the processor need not be retained longer in the DRAM cells than the retention time of the DRAM cells. Thus, indeed no refresh circuitry is necessary for the processor to carry out its computer program.

In a further embodiment, the invention relates to a method of running a program on a computer arrangement comprising a processor and at least one memory unit connected to said processor and comprising dynamic random access memory having a predetermined retention time, the method comprising the step of running a predetermined program on said processor while temporarily storing data during a storage time in at least part of said dynamic random access memory, wherein said storage time is shorter than said retention time and said method further comprises the step of using but not refreshing said at least part of said dynamic random access memory comprising said data during said running of said program.

Moreover, the invention relates to a computer program comprising instructions executable on a computer arrangement comprising a processor and at least one memory unit connected to said processor and comprising dynamic random access memory having a predetermined retention time, the computer program while running on said computer arrangement comprising the step of temporarily storing data during a storage time in at least part of said dynamic random access memory, wherein said storage time is shorter than said retention time and said computer program further comprises the step of using but not refreshing said at least part of said dynamic random access memory comprising said data during said running of said program.

Finally, the invention relates to a computer readable medium comprising a computer program as defined above.

BRIEF DESCRIPTION OF THE DRAWINGS

The invention will be explained with reference to some drawings which are only intended to illustrate the present invention and not to limit its scope which is only limited by the appended claims.

DESCRIPTION OF THE PREFERRED EMBODIMENT

The present invention will be illustrated with reference to a smart card application. However, it is to be understood that the concept of the present invention can be used outside the field of smart cards.

Figure 1:
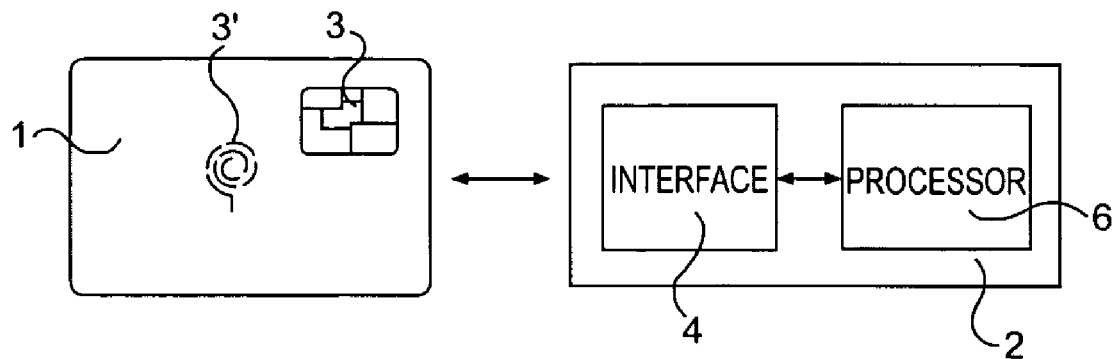
FIG. 1 shows a smart card and a terminal arranged to communicate with one another.

FIG. 1 shows a smart card 1 provided with a communication interface 3. The communication interface 3 is shown to include metallic pads. However, in contact-free embodiments, the interface comprises an antenna, e.g., a coil 3', shown in FIG. 1 with dashed lines. Such a smart card is widely known. FIG. 1 also schematically shows a terminal 2 which is arranged to communicate with the smart card 1.

Therefore, the terminal 2 comprises a communication interface 4 arranged to communicate with interface 3 of the smart card 1. The technical details for such contacting are known to persons skilled in the art.

The terminal 2 comprises a processor 6 connected to the communication interface 4. Through its communication interface 4, the processor 6 is able to communicate with the processor (not shown in FIG. 1) of the smart card 1.

The processor 6 is shown to be one block. However, if preferred, the processor 6 may be implemented as several sub-processors communicating with one another each dedicated to perform a predetermined task. One or more of said sub-processors might be located outside the terminal 2. Preferably, the processor 6 is (or the sub-processors are) implemented as a computer with suitable software. However, if desired, they may be implemented as dedicated digital circuits.

Figure 2:
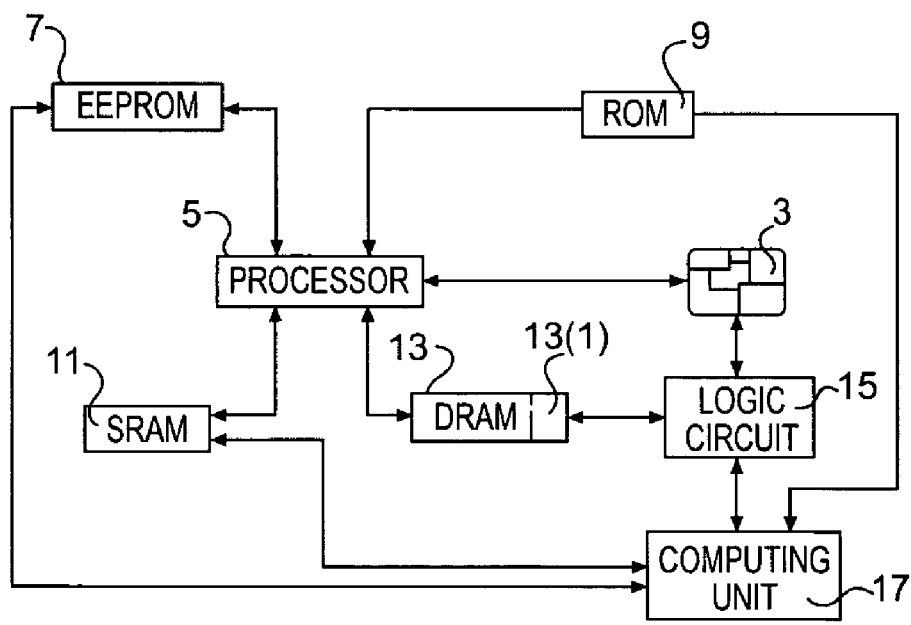
FIG. 2 schematically shows a computer arrangement using non-refreshed DRAM.

As shown in FIG. 2, the communication interface 3 of the smart card 1 is connected to a processor 5. In accordance with the invention, the processor 5 is connected to at least a first memory area 13 comprising DRAM (Dynamic Random Access Memory) cells.

In accordance with one embodiment of the present invention, at least part of the DRAM 13 is not connected to refresh circuitry. If the logic arrangement shown in FIG. 2 is used in smart card applications, preferably no refresh circuitry is applied at all. This saves space and circuitry in such a single chip computer. Of course, also in other applications one may decide to apply no refresh circuitry at all.

The DRAM 13 may be connected to a separate logic circuit 15, the operation of which will be explained hereinafter. The logic circuit 15 is connected to either a computing unit 17 or the communication interface 3. However, it is also possible that the logic circuit 15 is connected to both the computing unit 17 and the communication interface 3. Actually, processor 5, logic circuit 15 and computing unit 17 may be implemented as one processing unit. Moreover, all of the different units shown in FIG. 2 may be implemented as a single integrated chip.

The processor 5 is, preferably, also connected to a second memory area 11 comprising SRAM (Static Random Access Memory) cells.

Preferably, non-volatile memory such as EEPROM 7 connected to the processor 5 is also present. In most applications, also ROM (Read Only Memory) 9 connected to the processor 5 is provided.

If present, the computing unit 17 is, preferably, also connected to the ROM 9, the EEPROM 7, and the SRAM 11.

The ROM 9 and possibly the SRAM 11 and the EEPROM 7 contain the computer program that determines the behavior of the processor 5, and possibly also of the computing unit 17, when the processor 5 is used as a responding component in inter-computer communications through interface 3. In smart card applications, such inter-computer communications typically consist of command and response exchanges, which are constraint to a very short duration. For a contactless smart card, the time available for communication is typically in the order of 150 ms. In that short time period the smart card 1 receives one or more data transmissions that function as commands. The processor 5 processes the commands which typically include cryptographic computations and instructions to update the non-volatile memory 7. At the end of its processing, the processor 5 sends its response.

So far, the use of DRAM cells has not seriously been considered for smart card applications. They were considered to be too unreliable due to their inherent limited retention time and not to be cost-effective due to the necessary additional on-chip refresh logic circuitry to compensate for the limited retention time.

Now, contrary to the prior art, the arrangement according to the invention comprises DRAM cells 13 of which, in a preferred embodiment, at least part is not connected to refresh circuitry. Due to the field of application, the timing constraints are such that refresh circuitry is superfluous. Such timing constraints are most prominent in contactless smart card applications where due to field strength fluctuations experienced by the smart card chip, as it is moved by its user across a communication range of a terminal, all data exchange and processing must be completed in less than 150 ms.

However, also in other fields than contactless smart card applications the invention may advantageously be applied. In general, in accordance with the invention, a predetermined program is running on the processor that needs data to be temporarily stored on the dynamic random access memory 13 during a necessary storage time. This storage time for all portions of valid data during running the program, i.e., carrying out consecutive program steps, is such that it is shorter than the retention time of the dynamic random access memory 13 used. Thus, no refresh cycles for the DRAM are necessary anymore and refreshment will not be used anymore.

In practice, chips implemented according to the invention will remain having a limited RAM storage implemented with static cells to store data such as the return stack or essential security or program state values, the RAM consisting of, e.g., 128 bytes. As the basic memory cell of a DRAM is typically at least four times smaller than the basic memory cell of a SRAM, a chip in accordance with the invention can in average provide four times more memory at equal costs.

Figure 3:
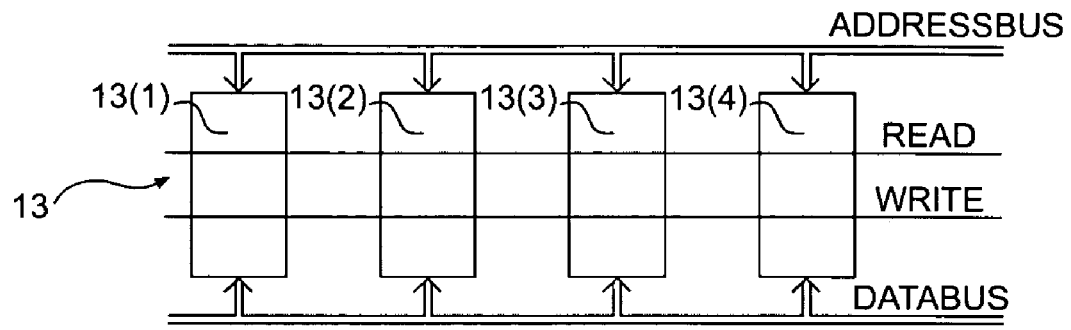
FIG. 3 schematically shows a division of the DRAM into four memory banks.

A further advantage of the present invention can be obtained by realizing the DRAM 13 not as a single controlled array but as two or more independently controlled simultaneously accessible banks 13(1), 13(2), 13(3), 13(4), as shown in FIG. 3. FIG. 3 shows four such banks, however, it is to be understood that the number of banks may be different. Using a number of different banks would facilitate the use of additional logic circuitry on a single chip computer arrangement. Such additional logic circuitry may relate to a coprocessor in the form of an additional computing unit 17 which is arranged to carry out additional cryptographic computations while using only one of the banks, e.g., bank 13(1).

To that end all banks 13(1) . . . 13(4) are connected to an address bus, a data bus and read and write lines (see FIG. 3). The signals carried by these different lines are known to a person skilled in the art. By means of the address bus, the computing unit 17 is able to address memory cells in bank 13(1) whereas these memory cells are, then, not accessible to processor 5. By providing a separate computing unit 17, computations can be carried out simultaneously, thus, ensuring that a process can be carried out in the required timing constraints of e.g. 150 ms.

It is observed that FIG. 3 is very schematic. The arrangement is such that at least one of the memory banks 13(1) . . . 13(4) can be selected independently from the other memory banks. This can be done by multiplexing techniques on the address bus, data bus, read and write lines. However, this may also be done by providing separate address busses, data busses, read and write lines for each independent memory bank, as is known to persons skilled in the art.

Instead of or in addition to using a computing unit 17, which accesses the DRAM 13 through the logic circuit 15, a DMA (Direct Memory Access) communication procedure can be provided for. To that end, the logic circuit 15 is, then, connected to the communication interface 3 such that an external processor (e.g., processor 6 of the terminal 2) is able to directly access DRAM 13. Preferably, through such a DMA communication procedure, the external processor is only able to obtain access to one of the banks 13(1) . . . 13(4). This all could increase the speed of execution and allow for reduced power consumption. Non-traditional CPU design, e.g. RISC (=Reduced Instruction Set Computer), might also benefit from multi-banked RAM.

Figure 4:
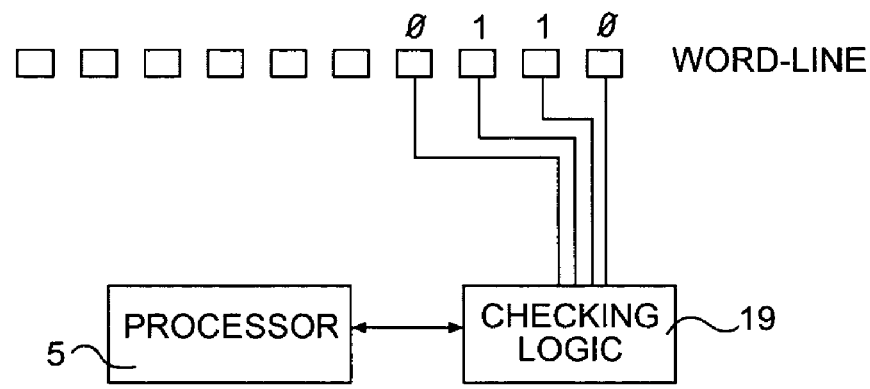
FIG. 4 schematically shows using some memory cells in a word-line arrangement for checking the proper operation of the DRAM cells.
Figure 5:
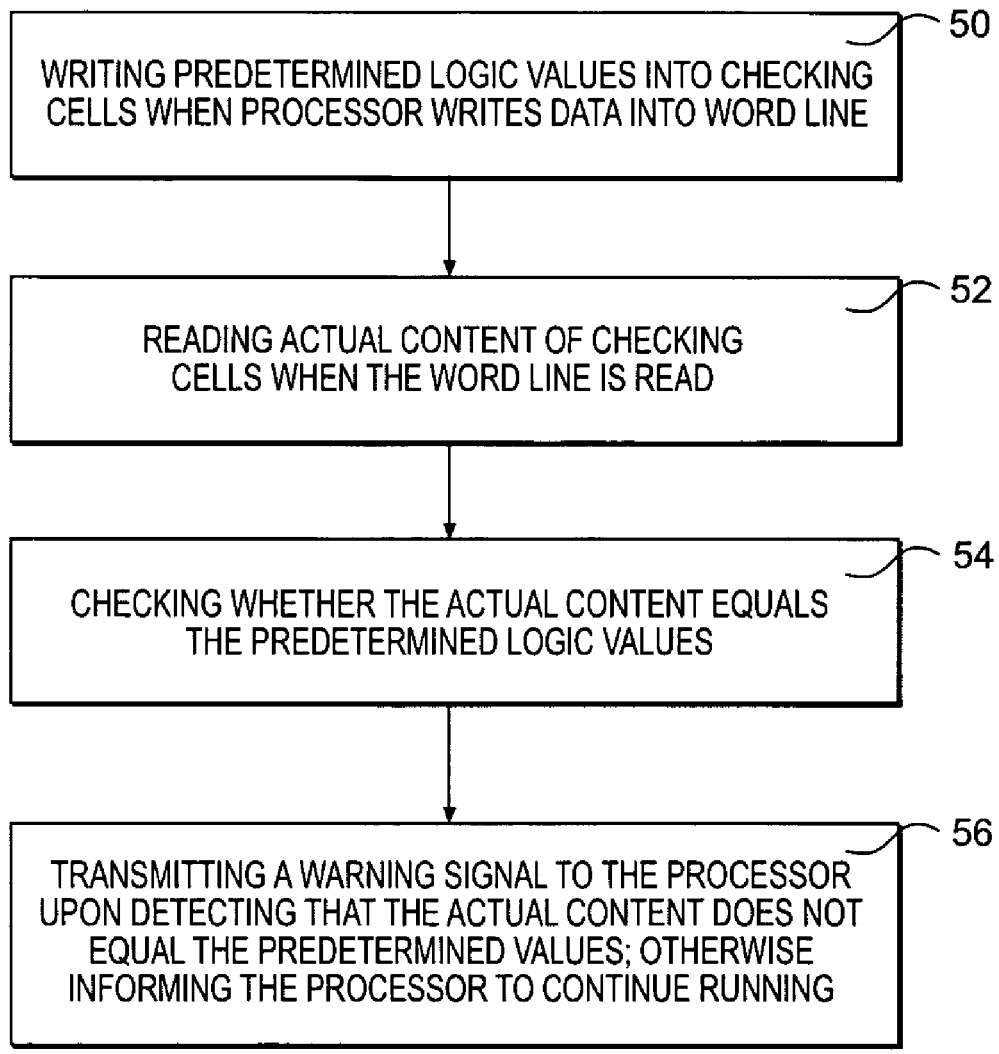
FIG. 5 shows a flow diagram of steps to be taken to check whether or not the content of the DRAM cells is still valid.

As customary, the DRAM cells may be organized into a rectangular structure consisting of a number of word-lines, each containing a number of bit memory cells to store data for a multiple of bytes. One such word-line is schematically shown in FIG. 4. To safeguard against unexpected longer storage periods than the maximum retention time of the individual DRAM cells which might result in using data incorrectly retrieved from the DRAM cells, each word-line in the memory area may comprise one or more "witness" storage cells. FIG. 4 shows a situation in which four such "witness" storage cells at the right-hand side of the word-line are used. As shown in step 50 of FIG. 5, these four storage cells, at the outset of a write action into the word-line, are provided with a predetermined pattern of data: in FIG. 4 this pattern is 0 1 1 0. Of course, an other pattern of predetermined logic values may be used. Also, the number of "witness" storage cells may differ. As shown in step 52 of FIG. 5, the "witness" cells are read each time data stored in the word-line cells is read by processor 5 or by any other additional logic processor, such as computing unit 17 (not shown in FIG. 4). Checking logic 19 connected to processor 5 (or any other additional processor present) is arranged to check whether the data pattern read from the "witness" cells still equals the predetermined logic pattern; step 54 in FIG. 5. If the predetermined logic pattern is not present anymore, the checking logic 19 will send a warning signal to the processor 5 (or any other processor concerned); step 56. Such a warning signal will, then, be interpreted as a failure of any data read by the processor 5 (or any other processor concerned). An appropriate execution exception then prevents normal completion of the actual program. If no failure has been detected, the actual program can continue running. This mechanism may be deployed to fend off attacks against the chip's integrity which might be mounted by artificially elongating the processing time to cause incorrect data to be used in computations.

Although, in FIG. 4, the checking logic 19 is shown as a separate unit it is to be understood that the checking logic 19 may be part of the processor 5 (or any other processor).

The "witness" storage cells may be part of the normally designed word-line. However, alternatively, a normally designed word-line may be extended by such "witness" storage cells. In one embodiment, these "witness" storage cells are designed such that their data retention times are significantly shorter, e.g. 5–10%; than the data retention times of the other memory cells on the same word-line. Thus, upon detecting that the content of the "witness" storage cells is correct it is even more likely that the content of the other storage cells of the same word-line is still correct by the time of reading.

In a further alternative embodiment, after having manufactured the DRAM cells it is tested which memory cells in a word line show the shortest retention times. One or more of these cells may then be used as "witness" cells.

To support obtaining the benefits of the invention and to ascertain conformance to the timing constraints of the DRAM 13, the software loaded in e.g. ROM 9 or EPROM 7 may be preprocessed and optimized with respect to storage timing by processor 6 of terminal 2. The processor 6 is arranged to compile that software. During pre-processing, the processor 6 analyzes the time period necessary for the processor 5 to carry out each instruction of the software and all retention times necessary for the processor 5 (or any other processor like the computing unit 17 using the DRAM 13) to temporarily store data in the DRAM 13 during running the software.

Figure 6:
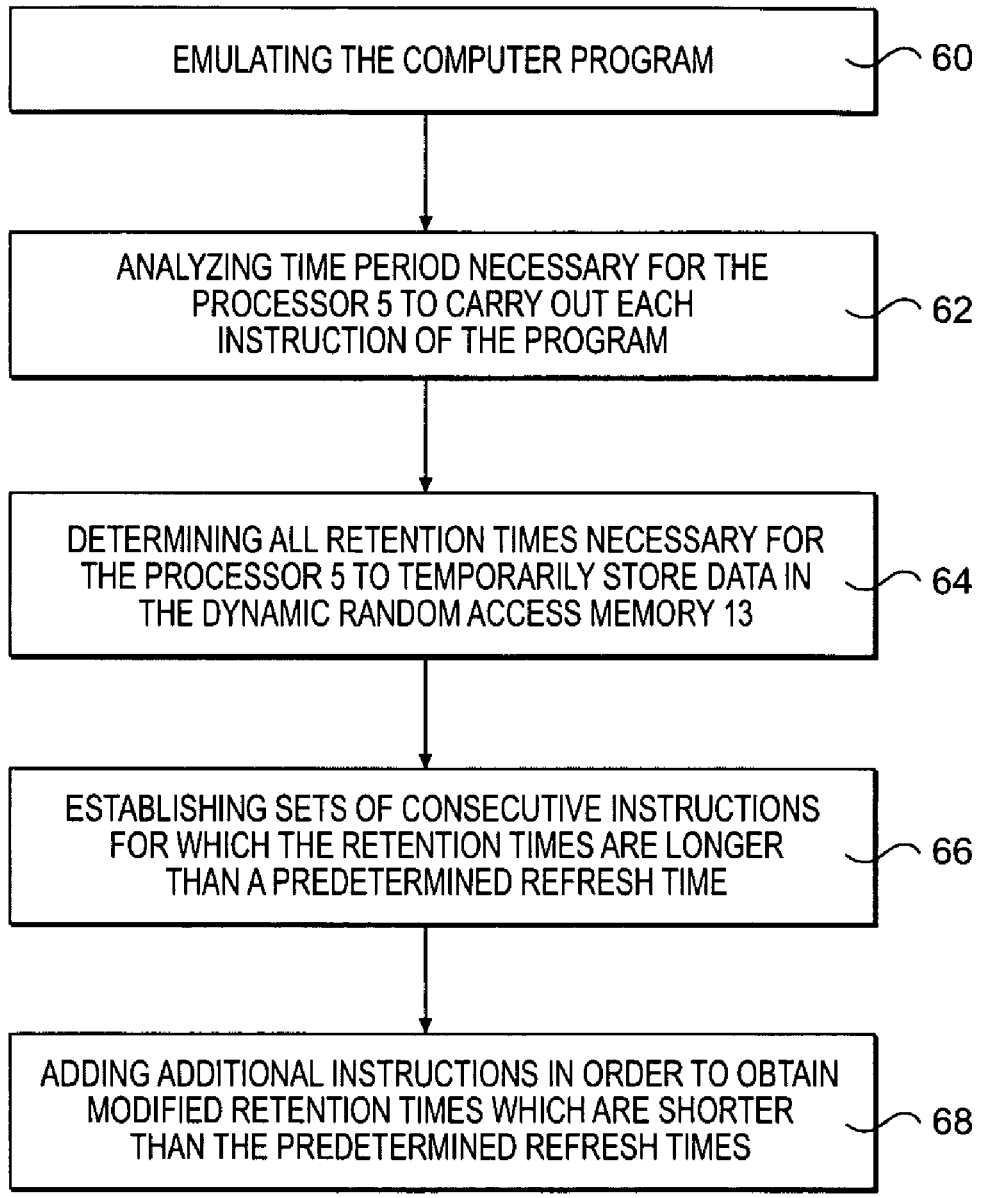
FIG. 6 shows a flow diagram of steps to be taken to amend a computer program such that the maximum retention times of data in memory cells are shorter than a specified retention time of the DRAM cells.

FIG. 6 shows steps carried out by processor 6 for such a preprocessing program. After having emulated the program, step 60, the processor 6 analyzes all sections of executable code of the software, step 62, and computes the time between updates of stored data used by the code sections, step 64. Then, the processor 6 establishes sets of consecutive instructions in the program for which the retention times in the DRAM 13 would be longer than the specified refresh time of the DRAM 13, step 66. Known techniques for code rearrangement, such as unrolling program loops and inserting additional instructions to explicit read-and-then-write storage locations, i.e. a kind of artificial refresh operation, are used to guarantee that all data stored by the software in the DRAM 13 is used well before the end of the memory cell retention period, step 68. Without using traditional refresh circuitry, then, still all DRAM cells are refreshed in time.

Above, the invention has been illustrated with reference to an embodiment in which the Dram 13 is physically not connected to a refresh circuitry. However, the principles of the invention may also be applied by disabling the refresh functionality of an existing computer arrangement comprising a refresh circuitry. In such an embodiment, existing refresh circuitry need not be taken away.

The invention claimed is:

1. A computer arrangement comprising a processor and at least one memory unit connected to said processor and comprising dynamic random access memory having a predetermined retention time, wherein the retention time is the time data is retained in said dynamic random access memory when no refresh operation is used, said computer arrangement being arranged for running a program having sections of executable code on said processor while temporarily storing data during a storage time in at least part of said dynamic random access memory, wherein said storage time is the time between updates of stored data used by the sections of executable code, and wherein the storage time is shorter than said retention time and said computer arrangement is arranged to use but not to refresh said at least part of said dynamic random access memory comprising said data during said running of said program.

2. A computer arrangement according to claim 1, wherein said at least part of said dynamic random access memory is not connected to refresh circuitry.

3. A computer arrangement according to claim 1 or 2, wherein said dynamic random access memory is divided into two or more memory banks each memory bank being independently accessible for storing or retrieving of data.

4. A computer arrangement according to claim 1, wherein a further part of said dynamic random access memory is controlled by additional logic circuitry.

5. A computer arrangement according to claim 4, wherein said additional logic circuitry is connected to a communication interface that enables an external computing unit to access the dynamic random access memory.

6. A computer arrangement according to claim 4, comprising an additional computing unit connected to said additional logic circuitry.

7. A computer arrangement according to claim 1, implemented as single chip arrangement.

8. A smart card including a computer arrangement according to claim 1.

9. A computer arrangement comprising a processor and at least one memory unit connected to said processor and comprising dynamic random access memory having a predetermined retention time, said computer arrangement being arranged for running a predetermined program on said processor while temporarily storing data during a storage time in at least part of said dynamic random access memory, wherein said storage time is shorter than said retention time and said computer arrangement is arranged to use but not to refresh said at least part of said dynamic random access memory comprising said data during said running of said program, wherein said dynamic random access memory is provided with a plurality of word lines, each word line comprising an array of memory cells, at least one of said word lines comprising a series of one or more memory cells connected to checking logic circuitry connected to said processor and arranged to carry out the following steps:
(a) writing predetermined logic values into said series of one or more memory cells whenever the processor writes data into said at least one word line;
(b) reading actual content of said series of one or more memory cells whenever said at least one word line is read by said processor;
(c) checking whether said actual content equals said predetermined logic values; and
(d) transmitting a warning signal to said processor upon detecting that said actual content does not equal said predetermined values.

10. A computer arrangement according to claim 9, wherein said series of one or more memory cells of said at least one word line is implemented using memory cells with less memory retention time than the other memory cells in said at least one word line.

11. A smart card comprising:
a processor that executes a program for processing a command received from an external terminal;
a dynamic random access memory that stores data for a storage time that is shorter than a retention time of the dynamic random access memory; and
refresh circuitry that is configured to refresh the dynamic random access memory,
wherein the refresh circuitry is disabled and the program uses the stored data before expiration of the retention time after which the stored data is unavailable to the program.

12. A method of running a program on a computer arrangement comprising a processor and at least one memory unit connected to said processor and comprising dynamic random access memory having a predetermined retention time, wherein the retention time is the time retained in said dynamic random access memory when no refresh operation is used, the method comprising the step of running a predetermined program having sections of executable code on said processor while temporarily storing data during a storage time in at least part of said dynamic random access memory, wherein said storage time is the time between updates of stored data used by the sections of executable code, and wherein the storage time is shorter than said retention time and said method further comprises the step of using but not refreshing said at least part of said dynamic random access memory comprising said data during said running of said program.

13. A computer-readable medium comprising a computer program including sections of executable code executable on a computer arrangement comprising a processor and at least one memory unit connected to said processor and comprising dynamic random access memory having a predetermined retention time, wherein the retention time is the time retained in said dynamic random access memory when no refresh operation is used, the computer program while running on said computer arrangement performing the step of temporarily storing data during a storage time in at least part of said dynamic random access memory, wherein said storage time is the time between updates of stored data used by the sections of executable code, and wherein the storage time is shorter than said retention time and said computer program further comprises the step of using but not refreshing said at least part of said dynamic random access memory comprising said data during said running of said program.

14. A smart card that communicates with an external terminal, the smart card comprising:
    a processor that executes a program for processing a command received from the external terminal; and
    a dynamic random access memory that stores data for a storage time that is shorter than a retention time of the dynamic random access memory,
    wherein the program uses the stored data before expiration of the retention time after which the stored data is unavailable to the program.

15. The smart card of claim 14, wherein the external terminal accesses the stored data before expiration of the retention time.

16. The smart card of claim 14, wherein the program includes instructions that have been analyzed to ensure the program uses data before expiration of the retention period.

17. The smart card of claim 14, wherein the smart card includes checking logic that is configured to write predetermined logic values in the dynamic random access memory that are used to validate the stored data when the stored data is being read from the dynamic random access memory.

18. The system smart card of claim 17, wherein the checking logic writes the predetermined logic values into a series of one or more memory cells of the dynamic random access memory when the processor writes data to a corresponding word line in the dynamic random access memory.

19. The smart card of claim 14, wherein the dynamic random access memory is implemented with memory banks and the stored data is dispersed among the memory banks, and wherein the smart card includes a computing unit that accesses stored data located on a first memory bank while the processor access stored data located on a second memory bank.

20. A method of processing information in a smart card having a processor, a dynamic random access memory having a retention time, and refresh circuitry, the method comprising:
    disabling the refresh circuitry;
    storing data in the dynamic random access memory for a storage time that is shorter than the retention time; and
    executing, by the processor, program code that uses the stored data before expiration of the retention time after which the stored data is unavailable to the program code.

21. The method of claim 20, wherein the smart card communicates with an external terminal and the method further includes:
    accessing, by the external terminal, the stored data before expiration of the retention time.

22. The method of claim 20, further including:
    analyzing the program code for instructions that use the stored data before expiration of the retention time.

23. The method of claim 20, wherein the dynamic random access memory is connected to checking logic, and the method further includes:
    writing, by the checking logic, predetermined logic values in the dynamic random access memory that are used to validate the stored data when the stored data is being read from the dynamic random access memory.

24. The method of claim 23, further including:
    writing, by the checking logic, the predetermined logic values into a series of one or more memory cells of the dynamic random access memory when the processor writes data to a corresponding word line in the dynamic random access memory.

25. The method of claim 20, wherein the smart card includes a computing unit and the dynamic random access memory is implemented with memory banks and the stored data is dispersed among the memory banks, and wherein the method further includes:
    accessing, by the computing unit, stored data located on a first memory bank while the processor access stored data located on a second memory bank.

* * * * *

UNITED STATES PATENT AND TRADEMARK OFFICE
CERTIFICATE OF CORRECTION

PATENT NO. : 7,020,740 B2 Page 1 of 1
APPLICATION NO. : 10/148927
DATED : March 28, 2006
INVENTOR(S) : Eduard Karel De Jong It is certified that error appears in the above-identified patent and that said Letters Patent is hereby corrected as shown below:

Column 9,
Line 42, "The system smart" should read -- The smart --.

Column 10,
Lines 4 and 45, "access" should read -- accesses --.

Signed and Sealed this

Twenty-seventh Day of June, 2006

JON W. DUDAS
*Director of the United States Patent and Trademark Office*